June 27, 1972 J. H. CALBECK 3,672,830
ZINC SULFIDE PIGMENT AND METHOD OF MAKING SAME
Filed May 5, 1969 2 Sheets-Sheet 1

INVENTOR.
JOHN H. CALBECK
BY
John H. Widdowson
ATTORNEY

INVENTOR.
JOHN H. CALBECK
BY
ATTORNEY

United States Patent Office 3,672,830
Patented June 27, 1972

3,672,830
ZINC SULFIDE PIGMENT AND METHOD OF
MAKING SAME
John H. Calbeck, Pratt, Kans.; by J. R. Calbeck, trustee
of the W. J. Trust, Pratt, Kans.
Continuation-in-part of application Ser. No. 338,244, Jan.
16, 1964, now Patent No. 3,443,888. This application
May 5, 1969, Ser. No. 821,937
Int. Cl. C01g 9/08
U.S. Cl. 23—135    4 Claims

ABSTRACT OF THE DISCLOSURE

The method of the invention provides a new zinc sulfide pigment having a particular shape predominately lamellar, and being of a thickness less than the planar dimensions. To produce such a thiosulfate type zinc sulfide, pigment particles are subjected to a triturating grind with classification preferably in a pebble grinding mill turning at a relatively slow speed, and operating so as not to cascade or tumble the particles, and to subject the pebbles to a rolling motion.

---

This application for patent is a continuation-in-part of my patent application pending in the Patent Office, Precipitation Method, Ser. No. 338,244, filed Jan. 16, 1964, and now Pat. No. 3,443,888.

This invention relates to a new zinc sulfide pigment, and to a method of making same. The zinc sulfide pigment of the invention when incorporated in present day latex and similar paint formulations has the singular property of producing paints of hiding power equal or superior to paints formulated with equal weights of titanium dioxide pigments.

Heretofore, most zinc sulfide pigments have been inferior to titanium dioxide pigments in hiding power being rated at 60% or less the hiding power of rutile titanium dioxide pigment. In processing these prior art zinc sulfide pigments to the final product for incorporation into paint, and the like, grinding and classifying steps are carried on wherein the zinc sulfide containing pigments are ground in a continuous closed circuit wet grinding system with hydroseparation, and it is common therein to use sodium pyrophosphate as the dispersing agent. The agent is normally added either as a continuous stream of a dry powder or as a solution of the salt in water, along with the pigment and water entering the ball mill grinding system. In the art a Dorr hydroseparator is usually the means of effecting the separating of fines from the course pigment due to the ease with which it can be operated. In a common prior art set up of equipment, an aqueous suspension of underground pigment containing about 10 parts by weight of water to 1 part by weight of pigment is fed to a continuous ball or tube mill operated at relatively high speed with violent tumbling of the balls or pebbles, and it is fed by either a pipe extending into the end of the mill or by a scoop feeder. In passing through the mill the product is ground in all dimensions. The mill discharge is continuously fed into a hydroseparator. The fines are overflowed and the course is returned to the ball mill where it is thoroughly distributed in the aqueous dispersion, and subjected to more violent grinding in all dimensions. The hydroseparator overflow is led into a coagulating tank where it is treated with a coagulating agent such as sulfuric acid or the salt of a bivalent or trivalent metal. The slurry thus produced is then dewatered by filtration of the equivalent thereof and dried in the usual manner. The object of these prior art practices is to produce a pigment fine enough in size for use in compounding a paint, without attention to or producing pigment particles not only of fine enough size for paint compounding, but also shaped by processing to do an exceptional job in coating and hiding.

The new zinc sulfide pigment of my invention results from my discovery that when zinc sulfide pigments are subjected to a proper triturating grind, whereby the crystalline particles are exfoliated, that is by proper triturating grinding, scales or laminae are split off or removed from the surface of the crude mother crystal, leaving substantially the same planar dimensions as the mother crystal but very much thinner, the resulting laminae when incorporated in latex paint formulations, alkyd flat paints, oil base paints and the like, develope hiding power properties equal or superior to rutile titanium pigments.

These lamellar particles can be split off of the crystal particles of many types of and any suitable zinc sulfide pigment, but desirably from soft, calcined types such as the thiosulfate precipated type commercially known as White Jack and fully described in my U.S. Pat. No. 2,006,259, issued June 25, 1935. These desired crystalline particles differ from the particles of other zinc sulfide pigments in that the particles of the latter are quite small when precipitated but grow to desirable pigment size (approx. .25 m$\mu$) when calcined, whereas the pigment particle size of the thiosulfate type is developed during precipitation and only requires calcination to remove water of hydration. Ordinary zinc sulfide crystal particles are partially fused by the calcination, and are very hard and of poor texture and require rather violent pebble mill grinding before even acceptable pigment properties are obtained. On the other hand the soft pigment particles developed by the low temperature calcining of the thiosulfate type crystals have the proper particle size when precipitated and require no pebble mill grinding, only simple dry disintegration and they have hiding properties up to 80% of rutile titanium dioxide. This latter procedure is fully described in my U.S. Pat. No. 2,006,269. The crystal habit of these particles are cubical, and the pigment particle shape is also more or less cubical both before and after calcining.

The new zinc sulfide of my invention is produced by preparing the thiosulfate zinc sulfide with a slightly larger particle size than recommended in my patent (0.3 m$\mu$), and subjecting it to a trituration grind in a slowly turning pebble mill to exfoliate a substantial amount of the particles into laminae, and collecting the lamellar particles. The calcination can be either before or after the trituration grind, the latter being preferred to simplify processing. This product when incorporated in latex paints has a hiding power rating of 100% that of rutile titanium dioxide. The trituration grind can be wet or dry. A wet grind preceding calcination has been found to be more efficient. A dry grind following calcination can also be used conveniently.

Also, I have discovered that when a non-exfoliated thiosulfate type zinc sulfide is used in a latex formulation and the grind made in a slow turning pebble mill for several hours, the zinc sulfide is triturated in situ to produce lamellar particles, and thereby hiding powers are obtained comparable with rutile titanium dioxide. Of course, this procedure has many practical advantages.

It is an object of this invention to provide a new pigment.

Another object of this invention is to provide a new method of making pigments.

Still another object of this invention is to provide a new zinc sulfide pigment.

Yet another object of this invention is to provide a new method of making zinc sulfide pigments.

It is another object of this invention to provide specially shaped zinc sulfide pigment crystals which are lamellar and which have a diameter several times greater than the thickness.

Another object of this invention is to provide a new method including trituration grinding of zinc sulfide crystals in a slowly turning ball or pebble mill wherein the grinding is obtained as a result of a rolling motion with no cascading or violence.

Yet another object of this invention is to provide new zinc sulfide lamellar pigment crystals having a diameter several times the thickness and which have hiding power equal to or greater than rutile titanium dioxide.

It is yet another object of this invention to provide a method for producing zinc sulfide pigment particles by reacting zinc sulfate and a thiosulfate and grinding the resulting recovered and washed crystals in a slowly turning pebble or ball mill in a trituration grind with the grinding carried on wet, dry or with the zinc sulfide pigment particles in situ in a paint formulation.

Other objects and advantages of the new pigment and method of my invention will become apparent to those skilled in the art from reading this disclosure.

Drawings accompany and are a part of this disclosure. They depict preferred specific embodiments of the new method of the invention for producing the new pigments of the invention. It is to be understood that the drawings are not to unduly limit the scope of the invention.

Figure 1:
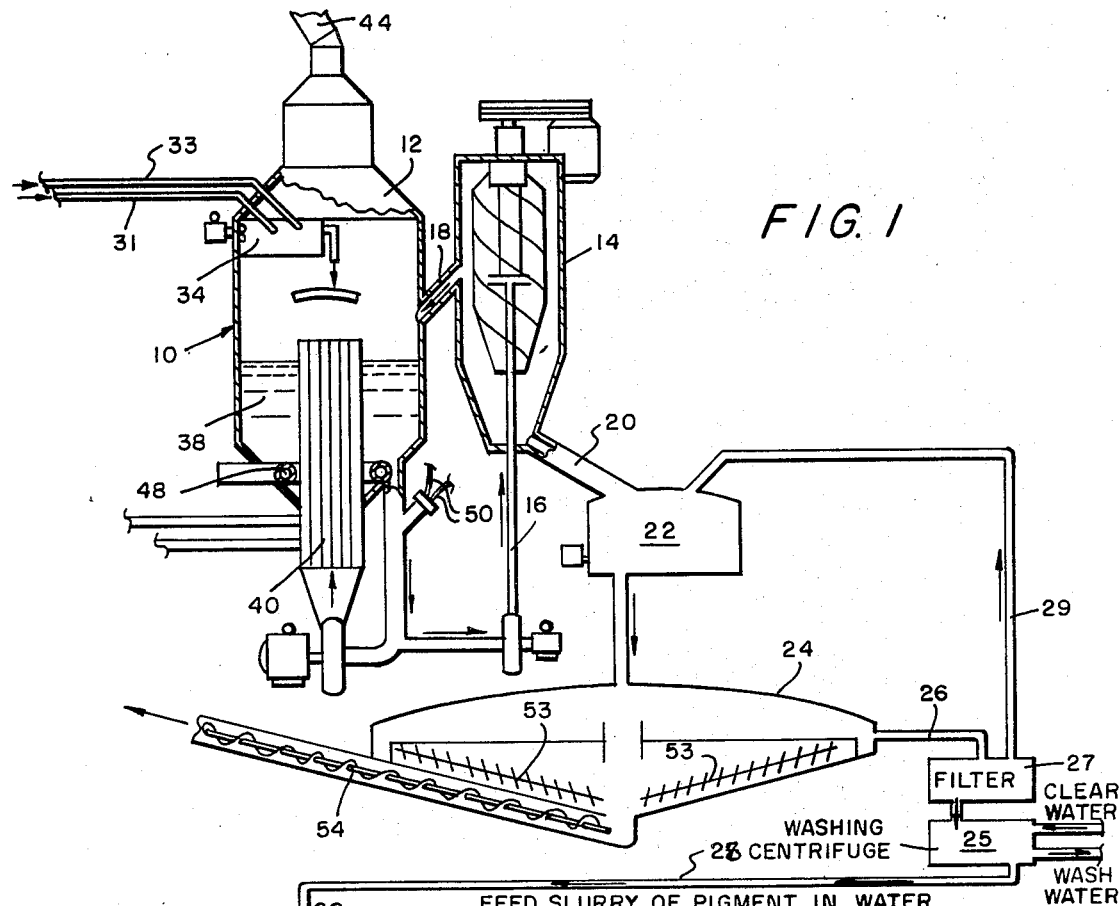
FIG. 1 is a schematic flow sheet in some structural detail depicting preferred methods and apparatus of my invention for producing a lamellar zinc sulfide pigment by reacting zinc sulfate with a thiosulfate under controlled conditions and recovering the resulting zinc sulfide crystals and trituration grinding same to produce the pigment.
Figure 1:
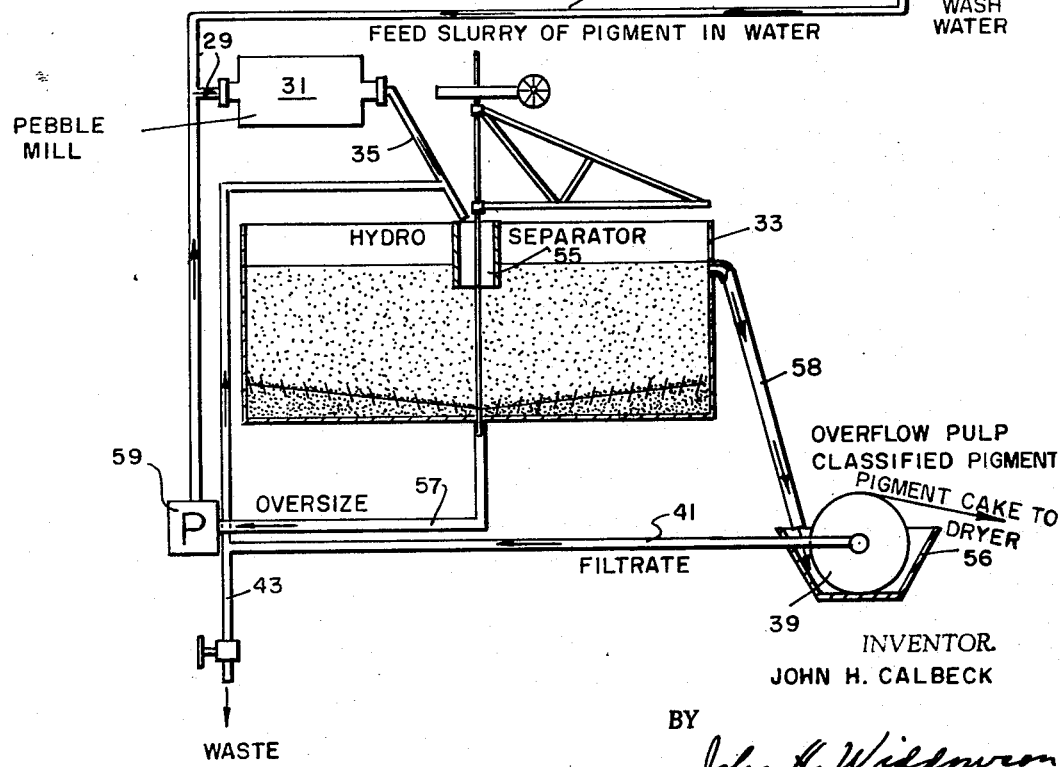

For understanding, the following shows the preferred specific use of the pigment of my invention, and its great value, namely as a paint pigment. Thiosulfate type zinc sulfide properly treated with a trituration grind in accordance with my invention, before incorporation in paint is referred to as "Exflo Type." Test formulations are shown in the accompanying Tables Ia, Ib. Comparison results are shown in Table II. The test formulation is a typical polyvinyl acetate test formulation using the Jones Dabney Latex PolyTex 600, and makes a test sample of ¼ pint of flat interior white wall paint. The comparisons are standard. The formulation was divided into four parts. Part one consisted of water and dispersants and other surface active agents. Part two consisted of the pigments and inerts. Part three consisted of the plasticizers, and part four the latex PolyTex 600. According to accepted practice, part one was prepared separately and then to it was added all the pigments of part two, and then the mixture was ground in a high speed mill or homogenizer. Part three was prepared separately and blended with part four by gently stirring same and a smooth blend was obtained. The gentle stirring was continued while the dispersed pigment slurry was added to it. Slow stirring was continued until a smooth texture was developed in about one hour, and the paint was ready for use, testing, etc. Contrasted to this, and for comparison, and to understand the practice of my invention, to obtain optimum hiding when the non-triturated zinc sulfide pigments were used (Table II) the above procedure, was modified as follows: The dispersion of the pigments and inerts was divided into three steps. All of the zinc sulfide was thoroughly dispersed in Solution No. 1 for at least one hour in a peble mill. The mill was turned at a low speed to prevent all "cascading" to obtain a trituration grind. A second step was the addition of part of the inert, in this case the china clay, for a one-half hour grind after which the remainder of the inerts were added and the trituration grind continued for one-half hour. This dispersion slurry was then added to the latex mixture and slowly stirred to obtain the finished paint as described above. This modification was used in all comparison tests and the improvement in hiding power in all pigments are shown in Table II. The tremendous improvement in hiding power in latex paints is obvious, and the improvement in all formulations is notable.

Draw down dry hiding.—The relative hiding of the zinc sulfide paints compared with rutile titanium dioxide paints made from the same formula, and an equal weight of the titanium pigment and prepared as described above was determined as follows. A draw down of each paint was made on a standard Bird vacuum plate mechanical applicator using a .006 inch doctor blade and a Moreset impenetrable black and white draw down chart form Nos. 010P. The charts were allowed to dry for at least 48 hours and the contrast Ratio of each determined with a Hunter multipurpose reflectometer, following the ASTM recommended procedure D–1738–66. The results of Table II are for the zinc sulfide pigments and the rutile titanium pigments used for evaluation standards. The total reflectance over a white background, WR, and over a black background, BR, are determined and the ratio BR/WR is the contrast ratio CR. Hiding power is a function of the difference of the contrast ratio of the reference paint (TiO$_2$ in this case) and the zinc sulfide paint. A simplified formula $H=100-650(CR_t-CR_z)$ was used to obtain the hiding of the zinc sulfide pigments in percent rutile titanium dioxide. As set forth, the untreated zinc sulfide paint showed only about 60% the dry hiding of modern rutile titanium pigment, but when given the trituration grind of my invetion it equaled or excelled the rutile titanium dioxide in the modern latex formulations. The trituration grind can precede or follow the calcination step with substantially the same results (see No. 6039 and LPP–71).

TABLE Ia.—PVA FOR JAR MILL

| | Water, g. | All other, g. | |
|---|---|---|---|
| Part 1 | 40.5 | | Tap water. |
| | | .20 | Colloid 677. |
| | | .25 | Sulfanol TG. |
| | | .26 | Napon dispersant. |
| | | .80 | Potassium tripolyphosphate. |
| | | 8.20 | Lecithin. |
| Total | | 9.71 | |
| Part 2 | | 37.5 | Zinc sulfied or titanium pigment. |
| | | 12.50 | Iceberg clay. |
| | | 9.50 | Camel calcium carbonate. |
| | | 6.25 | Magnesium silicate. |
| Total | | 65.75 | |
| Part 3 | 21.0 | | Tap water. |
| | | .65 | Hydrosol 250H. |
| | | 2.35 | Carbitol acetate. |
| | | 5.50 | Ethylene glycol. |
| Total | | 8.50 | |
| Part 4 | 1.5 | | Tap water. |
| | | .25 | Nopco defoamer. |
| | | 42.70 | PolyTex 600 Jones Dabney. |
| Total | | 42.95 | |

TABLE Ib.—ACRYLIC FOR WARING BLENDOR

[Rohm & Haas Formula #290]

| | Water, g. | All other, g. | |
|---|---|---|---|
| Part 1 | 115.50 | | Tap water. |
| | | .70 | Nopco NXZ defoamer. |
| | | 9.80 | Tamol 731 (25%) disperser. |
| | | 1.40 | Triton C.F. wetter. |
| | | 14.00 | Ethylene glycol. |
| Part 2 | | 157.50 | R-901 $TiO_2$ or Exflo zinc sulfide. |
| | | 105.00 | Iceberg-aluminum silicate (clay). |
| | | 17.50 | Zeolox 80. |
| | | 17.50 | Snowflake calcium carbonate. |
| | | .70 | Nopco NXZ. |
| Part 3 | 22.75 | | Tap water. |
| | | 249.90 | R & H-Ac22 Acrylic. |
| | | 14.00 | Tributal phosphate. |
| | | 77.00 | QP 4400 (2½%). |
| Total | 138.25 | 665.00 | |
| | | 138.25 | |
| Grand total | | 803.25 | |

TABLE II

| Paint No. | Pigment | Weight, g. | Reflectance, White/Black WR | Reflectance, White/Black BR | Contrast ratio C.R. | Percent hiding (corr. for weight) A. | Percent hiding (corr. for weight) B. | |
|---|---|---|---|---|---|---|---|---|
| 2206 P₁ | R-900 | 100 | 88.6 | 85.0 | 0.959 | 100.0 | 100.0 | PVA formu- |
| 2207 P₂ | 1940 Whitejack | 120 | 87.0 | 80.0 | 0.920 | 75.0 | 60.0 | lation used |
| 2208 P₃ | F 64-B 12 | 120 | 87.0 | 80.4 | 0.924 | 77.0 | 61.5 | by Litter |
| 2209 P₄ | XXX HP | 120 | 85.0 | 78.0 | 0.909 | 65.0 | 52.0 | lab. |
| 6036 | RA 50 | 100 | 92.8 | 92.0 | 0.991 | | 100.0 | Columbus. |
| 6037 | Exflo #1 | 100 | 90.8 | 90.4 | 0.996 | | 103.5 | P.V.A. |
| 6038 | R-90A | 100 | 94.3 | 83.8 | 0.995 | | 100.0 | Acrylic. |
| 6039 | Exflo #1 | 100 | 91.3 | 100.0 | | | 103.5 | |
| LPP-71 | Exflo #3 | 100 | 91.3 | 90.6 | 1.992 | | 102.0 | P.V.A. |
| LPP-57 | R-900 | 100 | | | 0.989 | | 100.0 | Columbus. |
| LPP-20 | R.A. 50 | 100 | 92.7 | 92.0 | 0.996 | | 100.0 | P.V.A. |
| LPP-19 | XXX HP | 100 | 88.7 | 86.2 | 0.972 | | 84.5 | Pratt. |
| LPP-14 | 1940 W.J | 100 | 92.0 | 91.0 | 0.989 | | 104.5 | P.V.A. |

NOTE.—Comparison Pigments, R-900, R-901, and R.A. 50 Rutile $TiO_2$. Zns Pigments, 1940 Columbus White Jack; F64-B12 continuous precipitation Fairmont City Lab; Exflo #1 new process precipitated and triturated before calcining; Exflo #3 Columbus White Jack Triturated XXX HP imported by Osborn—hard calcine type.

The addition of the inerts to the thoroughly dispersed zinc sulfide pigments slurry used in making the paint resulted in a flocculation of the lamellar particles onto the surfaces of the inerts thereby developing the high hiding characteristic of this lamellar product. In making a late paint when a soft calcined zinc sulfide is used that has not been previously processed by a trituation grind, the first dispersion grind in the No. 1 solution should be extended for several hours. One the other hand when the "Exflo Type" zinc sulfide is used to begin with only a short dispersion grind is required, and this can be done in a Waring Blender or other high speed mill.

The specific preferred embodiment of my invention is to precipitate the crude zinc sulfide pigment continuously as described in detail in my U.S. Pat. No. 3,443,888, May 13, 1969. Referring to the drawings hereof, FIG. 1 is the schematic flow sheet of the preferred specific embodiment of my invention, in general for understanding a reactor 10 consisting of a large volume forced circulation evaporator shell 12 coupled with a continuous centrifuge 14 is employed. The mother liquor in the reactor 10 is continuously circulated through the centrifuge 14 entering through pipe 16. The filtrate or partially classified liquor is returned to the reactor 10 through pipe 18. The solids removed by the centrifugal action are discharged through outlet 20 to a repulping agitator 22. The solids consisting of a mixture of zinc sulfide and by-product crystals are agitated in agitator 22 in a saturated solution and delivered to the bowl classifier 24. The finer zinc sulfide crystals remaining in suspension overflow through pipe 26 to a filler 27. Filtrate is returned via conduit 29 to the repulp agitator 22, and the zinc sulfide is discharged to a washing centrifuge 25, wherein the crude pigment crystals are washed with water prior to grinding.

In practice solutions, preferably saturated aqueous solutions of zinc sulfate and ammonium thiosulfate, are delivered continuously through conduits 31 and 33, respectively, in proper proportions to the pre-mixer 34. The combined mixture thereafter passes into the mother liquor 38. Preferably the stream of zinc sulfate has a concentration in the range of 170 to 190 grams of zinc ion per liter. The stream of ammonium thiosulfate preferably has a concentration in ther ange of 750 to 850 grams per liter. The rate of entry of the streams is adjusted so that generally stoichiometric proportions of zinc sulfate and ammonium thiosulfate are introduced. Preferably ammonium polysulfide is added to the thiosulfate stream in an amount sufficient to give the combined stream a very light yellow color thereby purging it of traces of sulfite ion and providing a low concentration of sulfide ion. The sulfide ion initiates the precipitation of zinc sulfide when the two reacting soltuions are mixed before being fed to the reactor.

Figure 3:
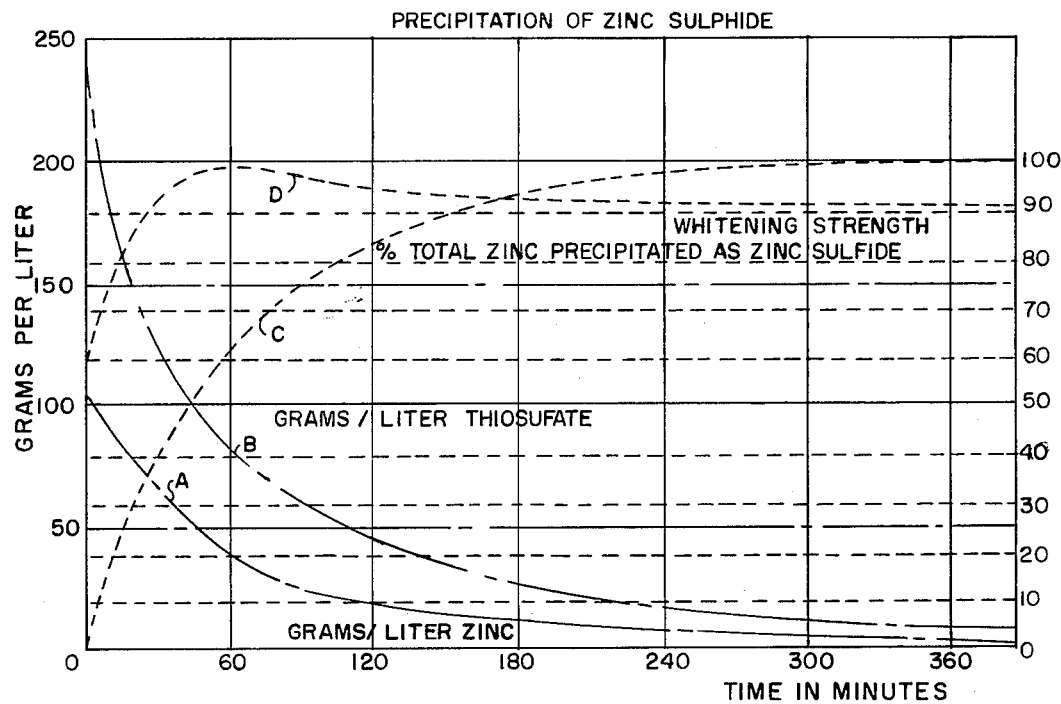
FIG. 3 is an operational chart, graphically depicting material concentrations from which optimum conditions for desired results can be obtained in carrying on the new method of my invention.
Figure 2:
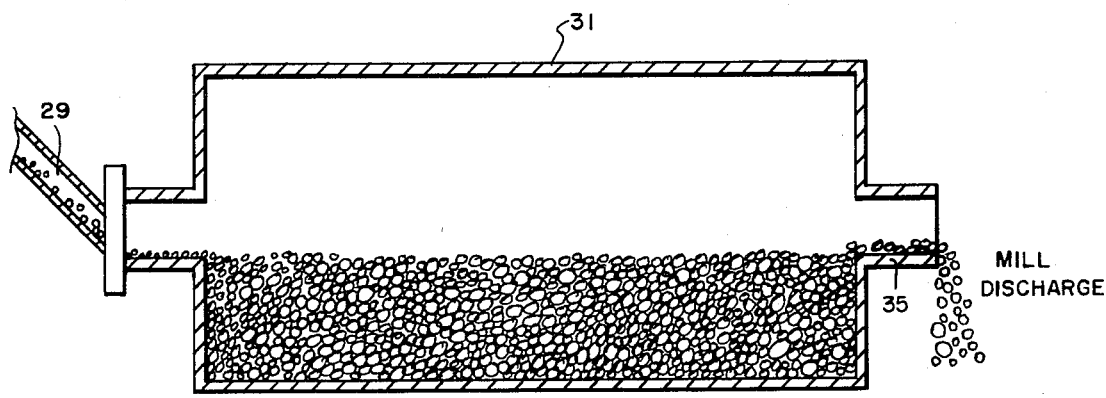
FIG. 2 is a longitudinal cross-sectional enlarged diagrammatic view of the pebble or ball mill of FIG. 1 of the drawings.

The concentration of the hot aqueous mother liquor 38 is adjusted and maintained to provide a favorable reactive environment for the precipitation of zinc sulfide. The determination of the proper concentrations in the mother liquor mixture are derived from the graph shown in FIG. 3 hereof (FIG. 2 in my Pat. No. 3,443,888). It is reproduced herein for ready reference. Its detailed description and explanation as to use are set forth in my patent. The preferred ranges of mother liquor concentrations are 25 to 60 grams per liter of zinc ion as zinc sulfide, more preferably 35 to 50 grams per liter, 50 to 100 grams per liter of ammonium thiosulfate, more preferably 60 to 90 grams per liter, 100 to 150 grams per liter of ammonium sulfate, more preferably 120 to 140 grams per liter, with the temperature at the boiling point. The boiling temperature is partially dependent on the atmosphereic pressure or other pressure and is known in the range of 110 to 120 degrees C. Pressure at or near atmospheric is suitable for processing my invention. The zinc sulfide particle size precipitated out under the aforementioned most preferred conditions is in practice desirable in the range of 0.25 to 0.35 micron, and the ammonium sulfate particle size in suspension normally greater than 44.0 microns.

Water is evaporated from the reactive aqueous mother liquor mixture 38 in an amount equal or approximately equal to the amount added in the combined feed streams to thereby maintain a constant liquid level in the reactor vessel 10. The evaporation of water is desirably accomplished with heating tubes 40 disposed within the evaporator shell 12. The evaporated water is exhausted from the evaporator shell 12 through the top, through the outlet 44.

Preferably diluted ammonia vapor is introduced into the evaporator shell 12 through a tube 48 immersed in the mother liquor mixture. Desirably one volume of ammonia gas is combined with two volumes of steam or an inert gas. Ammonia is added at the rate sufficient to maintain the pH of the mother liquor mixture preferably constant and in the range of 3.0 to 5.0. For purposes of controlling the pH of a mother liquor mixture there is immersed, electrodes 50 of pure antimony and pure zinc to a standard potentiometer (not shown). If desirable, the e.m.f. so developed can be used to control a valve or similar means to control the amount of ammonia admitted to the reactor vessel.

A portion of the resulting mother liquor mixture including the original mother liquor mixture and the precipitated crystals of zinc sulfide and ammonium sulfate is removed from the reactor 10 and delivered to the continuous centrifuge 14. The centrifuge is operated to substantially separate the mother liquor and the precipitate. The resultant mother liquor filtrate is recycled to the reactor 10 through pipe or outlet 18. The recycled filtrate from the centrifuge desirably has present therein, very small zinc sulfide particles and ammonium sulfate crystals which when returned serve as nuclei to "seed" the reaction mixture. The precipitate removed from the mother liquor mixture is delivered to a repulping tank 22 through outlet 20. The repulping tank 22 contains a saturated solution of ammonium sulfate. The mixture is thoroughly agitated. The mixture of zinc sulfide and ammonium sulfate crystals in the saturated solution are then delivered from the repulping tank 22 to the bowl classifier 24. The heavy ammonium sulfate crystals settle to the bottom and are raked toward the center with rakes 53, and then withdrawn by the conveyor 54 and used in the preparation of reagents or discarded. The finer zinc sulfide crystals remain in suspension and overflow through outlet 26 to a filter 27. The filter separates the zinc sulfide from the filtrate. The filtrate, a saturated solution of ammonium sulfate is returned to the repulping tank 22 through conduit 29.

The zinc sulfide is passed to the washing centrifuge 25 from the filter. The washed zinc sulfide in an aqueous slurry is withdrawn from washer 25 via 28 which is the crude zinc sulfide produced by the process. As a last step in the washing and for grinding the slurry is passed through line 29 into slowly revolving pebble mill 31 in closed circuit with a standard hydro-separator 33 via feed cup 55. The overflow from the hydro-separator 33 carries the lamellar zinc sulfide particles via line 58 to the filter 39 in trough 56 from which the filtrate is returned to the hydroseparator through line 41. The filter cake is subsequently dried, calcined, pulverized and packed. The under-flow from the hydro-separator is pumped back into mill 31 by pump 59 through line 57, where the slurry from line 28 is triturated. In mill 31 the wet grinding is gentle, with the pebbles and the zinc sulfide in a rolling motion free of cascading or tumbling.

Other specific examples of the practice of my invention are as follows, reference being had to the drawings:

EXAMPLE I

Milling prior to calcining 2640 ml. of boiling purified ammonium thiosulfate solution having approximately 800 grams per liter was dumped into 4500 ml. of a boiling solution of purified zinc sulfate of about 170 grams per liter zinc content in an aluminum reaction-vessel with a high speed agitator. Immersed in the mixture was antimony and zinc electrodes connected a potentiometer which registered 700 millivolts at the beginning, but showed an increase as sulfuric acid was generated in the solution. Ammonia gas was introduced into the boiling mixture to neutralize the acid as it was generated, and, to maintain a voltage of 700 to 730 millivolts. Boiling and agitation were maintained for six hours when the reaction was complete, and the contents of the reaction vessel was dumped into thirty gallons of clarified water and agitated for ten minutes. The crude zinc sulfide crystals were allowed to settle and the supernatant liquor siphoned off. This washing treatment was repeated three times or until all of the water soluble salts were removed. After the final decantation, the heavy zinc sulfide pulp was transferred to 1.34 gal. ball mill containing five pounds of ½ to ¾ inch porcelain balls. Additional water was added to make a slurry consisting of about one part zinc sulfide pigment to three parts water by weight and the mill turned at 24 r.p.m. for twenty four hours. This provided a slow rolling motion grind. The pulp in the mill was diluted further with an equal volume of clarified tap water and fed to a small agitator at a rate of about 40 ml. per minute where it was diluted with the settler overflow of about 40 ml. per minute. The diluted slurry was fed to a small laboratory hydro-separator where the exfoliated flake like zinc sulfide particles are floated to the top and overflow into a settler. The zinc sulfide settles to the bottom and the overflow is returned to the hydro-separator. After standing over night the semi-clear liquor in the settler is syphoned off and discarded and the settler product is filtered and dried at 110° C. The dry product is calcined with 3% sulfur in an atmosphere of carbon dioxide at 650 to 700° C. for 20 minutes, cooled in an atmosphere of carbon dioxide which makes it ready for use. A test latex paint No. LPP–71 (Table II, supra) was prepared using the formula of Table I$a$, .006 inch draw down made, dried 48 hours and tested. The evaluation compared with an equal weight of chloride process rutile titanium dioxide given in Table II gave 91.3% white reflectance and 102.0% dry hiding.

EXAMPLE II

Milling after calcining

One kilogram of finished thiosulfate type "white jack" zinc sulfide pigment was pulped in three liters of clarified tap water, slowly and gently milled in a 1.34 gallon mill with five pounds of ½ to ¾" porcelain balls for 24 hours at 24 r.p.m. The pulp was classified in a hydroseparator (see Example I), filtered and dried at 100° C. A latex polyvinyl acetate formula (see Table I) paint was prepared from the dry product using a Waring Blendor for less than five minutes to make the pigments grind (Parts 1 and 2). Draw downs and tests were made by the procedures of this specification, supra. The test elevation is reported in Table II, supra, as No. 6037. Compared with RA–50 sulfate process rutile titanium dioxide a rating of 90.8 white reflectance and 103.5% hiding was found and is reported.

EXAMPLE III

Milling after calcining

The procedure of Example II was followed exactly in a test, except that the test paint was acrylic as shown in Table I$b$, supra. The evaluation is reported in Table II as No. 6039, and the rating was 91.3% for white reflectance and 103.5% dry hiding, compared with a rutile chloride type titanium dioxide No. R–901.

EXAMPLE IV

In situ method

For the test the commercial "white jack" zinc sulfide used in Example II was given no special milling prior to use in the PVA formulation of Table I$a$. Instead the zinc sulfide of Part 2 was given a standard three hour small jar mill grind with water and the dispersant solution of Part 1 using ½ inch porcelain pebbles. After the three hours, the clay was added, ground for ½ hour, then the camel calcium carbonate and magnesium silicate added and the grinding continued for another ½ hour. Parts three and four were then added in the usual manner and the paint drawn down and tested as in Example I. The evaluation reported as LPP–14 in Table II shows this procedure to be as effective as special preformulation grinding and is rated as 92.0% white reflectance and 104.5% hiding compared to the titanium dioxide R–900.

In the foregoing examples and in Table II the percentage of white reflectance is the absolute light reflectance, whereas the percent hiding is percent of the comparison titanium dioxide pigment.

By using the electron microscope to examine the treated and untreated zinc sulfides, the effect of the trituration grinding on zinc sulfide of my invention is illustrated. The average particle size has been reduced slightly but the percentage of lamellar particles has increased greatly. Great numbers of the larger particles are not single crystals but are aggregates of the small lamellar particles. The tendency to form these "clumps" is characteristic of lamellar particles and the tendency is exceptionally strong with lamellar zinc sulfide.

Preferably the trituration grind of my invention is carried on until particles size of the lamellar zinc sulfide crystals is a diameter to thickness ratio greater than five to one, and I have found size of particles in terms of specific surface to desirably be approximately six square meters per gram or greater. With such the new zinc sulfide pigments of my invention gives high hiding with water thinned paints, and the advantage of highest hiding has been found to be given with solvent type paint formulations, for example, solvent type alkyd resin flat wall paints. Inert extenders aid hiding power with my new pigments. In solvent type enamel paints where normally little or no inert extenders are used, I have found that equally high hiding can be obtained by using mixtures of the new lamellar zinc sulfide pigment of my invention and other prime pigments such as zinc oxide, titanium dioxide, etc. these uses and results are obtained with the new pigment irrespective of the grinding method used, that is, the wet grinding in the slow ball or pebble mill of the flow sheet depicted method herein, or what would most likely be a large commercial operation, namely dry trituration grinding in a slow ball and air classifying.

I claim:

1. A method of manufacturing an improved zinc sulfide pigment, comprising:
   (a) in an aqueous reaction zone at a temperature at or near the boiling temperature and a substantially constant pH, reacting zinc sulfate and a thiosulfate selected from the group consisting of ammonium thiosulfate, potassium thiosulfate, sodium thiosulfate, and the like,
   (b) precipitating therefrom crude zinc sulfide particles generally cubic, soft, and fully formed during said precipitating,
   (c) separating the resulting crude pigment particles precipitate from the mother liquor,
   (d) passing the resulting washed particles into a pebble mill in circuit with a classifier and grinding same therein by trituration while turning said pebble mill at a relatively slow speed and rolling the pebbles therein, splitting off laminae from the surface of said particles and producing a plurality of thinner particles of substantially the same planar dimension, such being lamellar zinc sulfide pigment particles having a thickness less than the planar dimensions,
   (e) removing the resulting lamellar zinc sulfide pigment particles from said mill and passing same into a drying and calcining zone, and therein drying and calcining same,
   (f) cooling the resulting calcined pigment particles, and
   (g) pulverizing in a dry condition the cooled pigments to produce a zinc sulfide pigment product.

2. The method of claim 1, wherein latex paint dispersing medium is passed into said mill along with the zinc sulfide pigment particles and is present during said trituration grinding as the grinding medium.

3. The method of claim 1, wherein:
   (a) a latex pain dispersing medium is passed into said mill along with the crude zinc sulfide pigment particles and is present as the grinding medium during said triturating grinding, and
   (b) said dispersing medium is withdrawn from said mill along with said classified lamellar zinc sulfide.

4. The method of claim 1 wherein:
   (a) said resulting crude pigment particles have a size predominately in the range of 0.25 to 0.35 micron, and are washed free of water soluble salts,
   (b) said resulting lamellar zinc sulfide pigment particles are dried and calcined in said zone therefor in a non-oxidizing atmosphere at a temperature in the range of 600° to 750° C., and
   (c) said cooling of the calcined pigment particles is carried on in a non-oxidizing atmosphere.

References Cited

UNITED STATES PATENTS

| | | | |
|---|---|---|---|
| 2,006,259 | 6/1935 | Calbeck | 23—135 |
| 2,186,095 | 1/1940 | Booge et al. | 106—293 |
| 2,232,696 | 2/1941 | Erle | 241—14 |
| 2,337,162 | 12/1943 | McCleary | 241—22 |
| 2,451,785 | 10/1948 | Thau | 241—21 X |
| 3,332,631 | 7/1967 | Wood | 241—26 |
| 3,443,888 | 5/1969 | Calbeck | 23—56 |

OTHER REFERENCES

Chadderton, J. L., "The Philosophical Magazine," vol. 85; January 1963; London; p. 167.

OSCAR R. VERTIZ, Primary Examiner

G. O. PETERS, Assistant Examiner

U.S. Cl. X.R.

106—293

UNITED STATES PATENT OFFICE
CERTIFICATE OF CORRECTION

Patent No. 3,672,830　　　　　　　　　Dated June 27, 1972

Inventor(s) John H. Calbeck

It is certified that error appears in the above-identified patent and that said Letters Patent are hereby corrected as shown below:

Column 1, line 2, "particular" should read -- particle -- .
Column 2, line 24, "precipated" should read -- precipitated -- .
Column 4, line 10, "peble" should read -- pebble -- ; same line, cancel "low" and insert -- slow -- ; line 31, "Nos." should read -- No. -- ; line 47, "invetion" should read -- invention -- ; line 62, "sulfied" should read -- sulfide -- .
Column 5, Table II, under "Contrast Ratio" and opposite Paint No. LPP-71, "1.992" should read -- 0.992 -- ; line 41, "late" should read -- latex -- ; line 43, "trituation" should read -- trituration -- ; line 66, "filler" should read -- filter -- .
Column 6, line 3, "ther ange" should read -- the range -- ; line 12, "soltuions" should read -- solutions -- . Column 10, line 12, "pain" should read -- paint -- .

Signed and sealed this 26th day of December 1972.

(SEAL)
Attest:

EDWARD M. FLETCHER, JR.　　　　　　　ROBERT GOTTSCHALK
Attesting Officer　　　　　　　　　　　Commissioner of Patents